US012572856B1

(12) United States Patent
Behera et al.

(10) Patent No.: US 12,572,856 B1
(45) Date of Patent: Mar. 10, 2026

(54) SYSTEM AND METHOD FOR EVALUATING GENERATIVE ARTIFICIAL INTELLIGENCE OUTCOMES

(71) Applicant: Morgan Stanley Services Group Inc., New York, NY (US)

(72) Inventors: Anshuman Behera, Kearny, NJ (US); Raka Rajanigandha, Jersey City, NJ (US); Vidhan Janak Dhagai, Mumbai (IN); Mazeed Ahamed Mohammed, Anantapur (IN); Sujit Eapen, Plainsboro, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/202,544

(22) Filed: May 8, 2025

(51) Int. Cl.
*G06N 20/00* (2019.01)

(52) U.S. Cl.
CPC ..................................... *G06N 20/00* (2019.01)

(58) Field of Classification Search
CPC ...................................................... G06N 20/00
See application file for complete search history.

(56) References Cited

U.S. PATENT DOCUMENTS

| | | | |
|---|---|---|---|
| 12,147,513 | B1 | 11/2024 | Jain et al. |
| 2024/0289395 | A1 | 8/2024 | Zhou et al. |
| 2024/0289558 | A1 | 8/2024 | Muraoka et al. |
| 2024/0296314 | A1 | 9/2024 | Singh et al. |
| 2024/0296315 | A1 | 9/2024 | Singh et al. |
| 2024/0311618 | A1 | 9/2024 | Sukhavasi et al. |
| 2024/0330655 | A1 | 10/2024 | Hearty et al. |
| 2024/0362417 | A1 | 10/2024 | Imani et al. |
| 2024/0378396 | A1 | 11/2024 | Bhupati et al. |

OTHER PUBLICATIONS

Chang, Yupeng, Xu Wang, Jindong Wang, Yuan Wu, Linyi Yang, Kaijie Zhu, Hao Chen et al. "A survey on evaluation of large language models." ACM transactions on intelligent systems and technology 15, No. 3 (2024): 1-45. (Year: 2024).*
Banerjee, Debarag, Pooja Singh, Arjun Avadhanam, and Saksham Srivastava. "Benchmarking LLM powered chatbots: methods and metrics." arXiv preprint arXiv:2308.04624 (2023). (Year: 2023).*
Liu, Zhiwei, Weiran Yao, Jianguo Zhang, Le Xue, Shelby Heinecke, Rithesh Murthy, Yihao Feng et al. "Bolaa: Benchmarking and orchestrating llm-augmented autonomous agents." arXiv preprint arXiv:2308.05960 (2023). (Year: 2023).*

* cited by examiner

*Primary Examiner* — Casey R. Garner
(74) *Attorney, Agent, or Firm* — Leason Ellis LLP

(57) ABSTRACT

A computer-implemented method of assessing a large language model (LLM) includes receiving user inputs concerning the LLM including selected hyperparameters, a use case, at least one prompt, and examples. The user inputs are mapped with a glossary of metrics to determine recommended metrics and recommended prompts for the LLM. A minimum recommended sample size is determined based on the user inputs, recommended at least one metric and expected confidence and accuracy. An LLM-generated dataset related to the use case is augmented when it is determined that the LLM-generated dataset has fewer entries than the minimum recommended sample size. An evaluation report is then generated for assessing the recommended at least one metric for determining the accuracy of: i) the LLM based on the user inputs, recommended at least one metric and the LLM-generated dataset, ii) the at least one user prompt, and iii) at least one recommended prompt.

10 Claims, 7 Drawing Sheets

SYSTEM AND METHOD FOR EVALUATING GENERATIVE ARTIFICIAL INTELLIGENCE OUTCOMES

FIELD OF THE DISCLOSURE

The present disclosure relates to artificial intelligence systems, and more particularly, relates to a system and method for evaluating generative artificial intelligence outcomes.

BACKGROUND OF THE DISCLOSURE

The latest generation of artificial intelligence algorithms, referred to as generative artificial intelligence ("generative AI") uses models that learn underlying patterns and structures of data to produce new data. Generative AI platforms include chatbots such as ChatGPT, Copilot, and Gemini and text-to-image AI image generation systems such as Stable Diffusion. ChatGPT is one of a number of OpenAI offerings that can be freely used for problem solving. Indeed, OpenAI platforms having been used to solve certain key business problems such as Enhanced Due Diligence (EDD) requirements effortlessly.

However, there are few tools that can gauge the accuracy of Generative AI solutions or even agreed-upon metrics that can be employed the accuracy of such outcomes. Reliable knowledge of the accuracy of GenAI outcomes is essential for meeting regulatory requirements, making effective decisions, and building operational efficiencies. Evaluation is therefore a crucial phase of AI build-out to sufficiently certify the reliability and accuracy of the net results from generative AI applications. Inadequate evaluation can result in deployment of flawed models, leading to poor decisions, customer dissatisfaction, financial losses, etc.

What is therefore needed is a solution that properly evaluates the accuracy of generative AI applications and minimizes the risk of deploying unreliable AI models.

SUMMARY OF THE DISCLOSURE

The present disclosure describes a computer-implemented method of assessing a large language model (LLM). The method includes receiving user inputs concerning the LLM including selected hyperparameters, a use case, at least one prompt, and user provided examples. The user inputs are mapped with a glossary of LLM metrics to determine at least one recommended metric and at least one recommended prompt for the LLM. A minimum recommended sample size is determined based on the user inputs, recommended at least one metric and expected confidence and accuracy. An LLM-generated dataset related to the use case is augmented when it is determined that the user inputs and LLM-generated dataset has fewer entries than the minimum recommended sample size. An evaluation report is then generated for assessing the recommended at least one metric for determining the accuracy of: i) the LLM based on the user inputs, recommended at least one metric and the LLM-generated dataset, ii) the at least one user prompt, and iii) at least one recommended prompt.

These and other aspects, features, and advantages can be appreciated from the following description of certain embodiments and the accompanying drawing figures and claims.

DESCRIPTION OF CERTAIN EMBODIMENTS OF THE DISCLOSURE

The present disclosure describes a generative AI workbench application that incorporates four specialized tasks to provide a comprehensive framework for assessing generative AI platforms such as large language models (LLMs). The specialized tasks, which are each described in detail below, include prompt engineering, data analysis, intelligent evaluation, and an approval navigator/certification. The workbench helps determine both "objective" and "subjective evaluations" as well as facilitates an approval process.

The workbench application provides a streamlined evaluation process tailored to specific business, technology, and regulatory needs and results in the enhanced accuracy and reliability of generative AI outcomes. With improved confidence in outcomes, the time-to-market of generative AI build-outs can be accelerated. Additionally, the process for meeting regulatory requirements and obtaining necessary approvals is also streamlined, thus reducing legal and operational risks.

Figure 1:
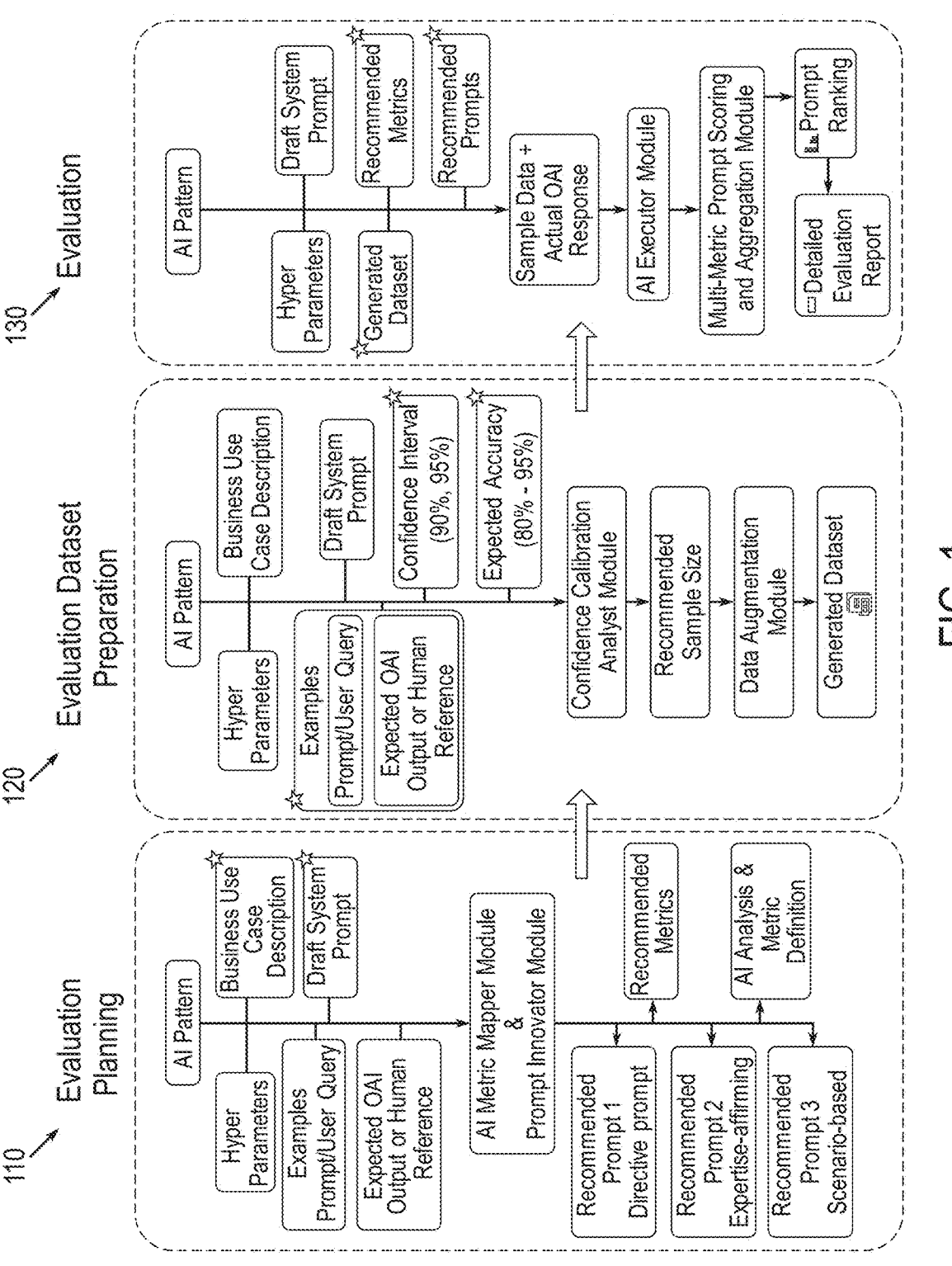
FIG. 1 is a block diagram of a high-level architecture of a generative AI workbench application that incorporates specialized tasks to provide a comprehensive framework for assessing generative AI platforms such as large language models (LLMs).

FIG. 1 is a block diagram of a high-level architecture of an embodiment of the workbench application. As shown, there are three main divisions to the architecture, an evaluation planning process 110, and evaluation dataset preparation process 120, and a final evaluation process 130. As shown, the processes follow in sequence, commencing with the evaluation planning process 110 followed by the evaluation dataset process 120 and ending with the final evaluation process 130.

Figure 2:
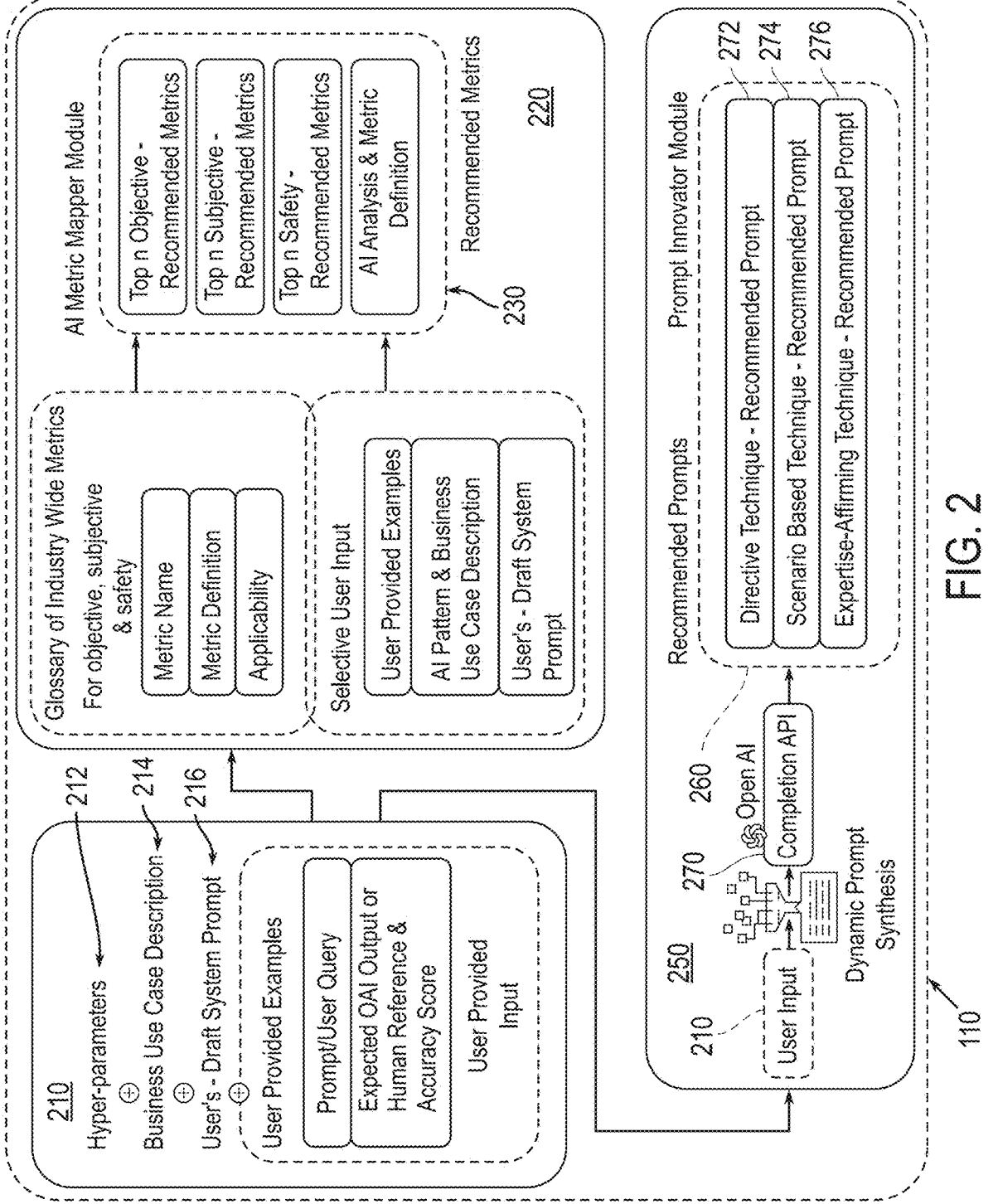
FIG. 2 is a flow diagram of an embodiment of the evaluation process according to the present disclosure.

FIG. 2 is a flow diagram of an embodiment of the evaluation process 110 according to the present disclosure. The evaluation planning process 110 starts with reception of a number of selective user inputs 210. Selective user Inputs 210 include the generative AI model being evaluated (e.g., GPT 4.0, GPT TURBO) along with the hyperparameters 212 associated with the model (e.g., temperature, top p, top k); a business use case description 214 including draft system prompts and AI patterns (e.g., translate, summarize, search, etc.); and user-provided examples 216 including user prompts, expected model response and accuracy score. The inputs 210 flow to a mapping process 220 that is designed to output suggestions of evaluation metrics to be used for the user's generative AI use case. A set number (e.g., four, five, ten, etc.) of evaluation metrics can be output as suggestions. In addition to the selective user input inputs 210, the mapping process 220 utilizes a glossary of industry-wide metrics 224 as source information. The glossary of metrics 224 include metric names, metric definitions as well as the applicability of the various metrics to different known models.

Figure 3:
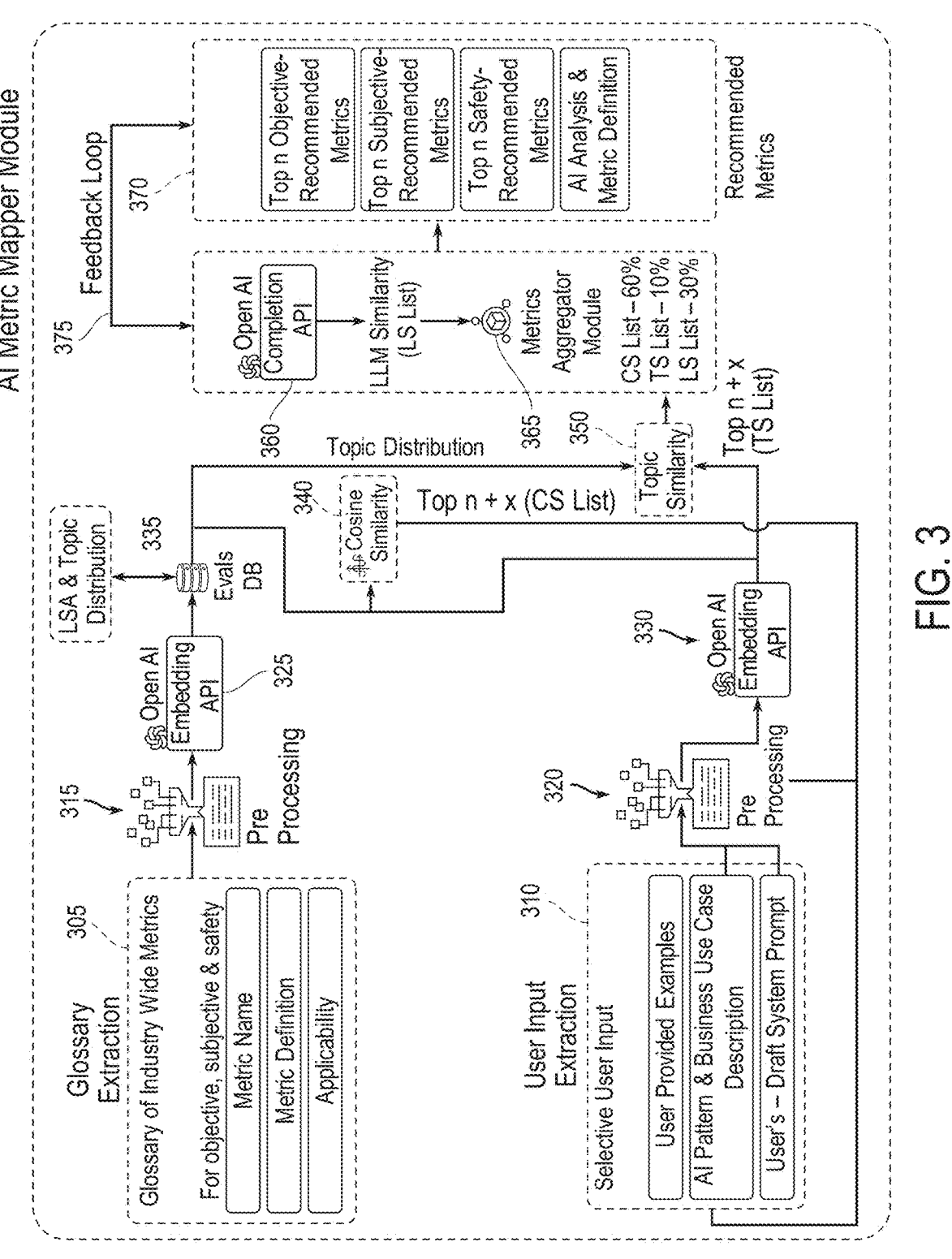
FIG. 3 is a flow diagram which illustrates an embodiment of the metric mapper module process according to the present disclosure.

The selective user inputs 210 and metrics glossary 224 are source inputs to the metric mapper module 230 ("metric mapper module" for brevity). The Metric Mapper Module 230 constitutes a system that performs a multi-step process that combines various similarity measures and machine learning techniques. FIG. 3 illustrates the metric mapper module process in greater detail. In a first data preparation step, the glossary 224 is extracted 305. Separately, the user inputs 210 are also extracted 310. For example, the metric mapper module 230 can extract metric names, definitions and can use one or more AI models (e.g., LLMs) to determine metric pattern applicability from the glossary 224. User input 210, which can be formatted as a table is parsed and one or more AI models are used to obtain the name, business use can summary and system prompt from the US input. The text that is obtained from the glossary during extraction step 305 is cleaned and tokenized 315 and in a separate branch the same pre-processing 320 is performed on the extracted text from the user input. Pre-processing 315, 320 also includes normalization of the text data (e.g., (lowercasing, removing punctuation, stop words removal, etc.).

The pre-processed text of the glossary input is input to a first feature engineering process 325 and the pre-processed text derived from the user input is input to a second feature engineering process 330. In a first part of the feature engineering processes 325, 330, an embedding API or similar vectorization process is used to convert the text data into vector representations. The vectorized glossary data is stored in a vector database 335. The second part of the feature engineering 325, 330 involves topic modeling on the metric definitions. In topic modeling, an AI model applies latent semantic analysis (LSA) and topic distribution analysis to the metrics glossary data to identity underlying topics or themes. Topics that are conceptually similar are grouped together in this process.

At this point the two branches of the process are united and similarity calculations are performed on the two groups of output from the feature engineering processes. First, cosine similarity is determined 340 between the vectorized glossary input 325 and the vectorized user input 330. Cosine similarity 340 measures textual similarity. The output of the cosine similarity as a list of the top n+x metrics determined to be most similar. A second similarly calculation is performed using topic similarity 350. In the topic similarity calculation 350 the topic distributions (from LSA) of the topic modeling of the glossary and user input data are compared using distance measures. The output of this process is also a list of the top n+x most similar metrics.

The top n+x from output by the cosine similarity measurement 340 (CS List) and the top n+x from the topic similarity measurement 350 (TS List), the user examples for prompts that form part of the extracted user input 310 as well as the output of the pre-processing 320 is fed to an LLM (e.g., OpenAI's Completion API 360 and Metric Aggregator module 365) which outputs a composite list of recommended metrics based on weightings of the inputs. In some implementations cosine similarity is weighted the highest (e.g., 60%), metrics derived from user selected prompts along with the output of the pre-processing from 320 is weighted next highest (e.g., 30%) while topic similarity is weighted least (e.g., 10%). More specifically, in some implementations, the completion API 360 in combination with the Metric Aggregator module 365 determines a composite similarity score to rank all metrics from the glossary. A certain number of top metric scores (e.g. 3, 4, 5, 8) are determined from three separate categories: objection, subjective and safety. The top metrics for each category are presented as suggestions 370 to the user along with Information concerning the metrics including metric names and descriptions of their relevance based on their similarity scores and analysis. At the final stage of the metric mapping process, the user can provide feedback 375 on the suggested metrics. The feedback 375 can be used to refine the individual models to balance out the weights and provide continuous learning to update the model and its parameters based on feedback and new data to improve accuracy and relevance.

This metric mapping approach leverages a combination of text similarity, topic modeling, and pattern matching to provide tailored metric suggestions that align closely with the user's specific generative AI use case. Also, by integrating feedback loops, the system can evolve and adapt to changing needs and new insights.

Returning to FIG. 2, after the recommendations of the metric mapping process have been output, there is a prompt innovation process 250. In this process, user inputs 210 including the user-defined system prompt and business use care are fed to a prompt innovator module 260 which can be an LLM (OpenAI's Completion API) 260. The prompt innovator module 260 synthesizes dynamic prompts based on the provided inputs, employing various prompting techniques to generate three distinct prompt variations. The three prompt variations each align with different strategic approaches and include: a directive technique 272 which generates a prompt that provides explicit instructions to the LLM; a Scenario-Based Technique 274 which crafts a prompt situating the LLM within a hypothetical but plausible scenario, enhancing contextual understanding; and an Expertise-Affirming Technique 276 which formulates a prompt that underscores the LLM's role as an expert within a specific domain. Prompts generated using techniques 272, 274, 276 are designed to reduce redundancy and enhance the specificity and effectiveness of the user's initial system prompt. Post-evaluation, such prompts can be further analyzed to rank their performance and efficacy.

Figure 4:
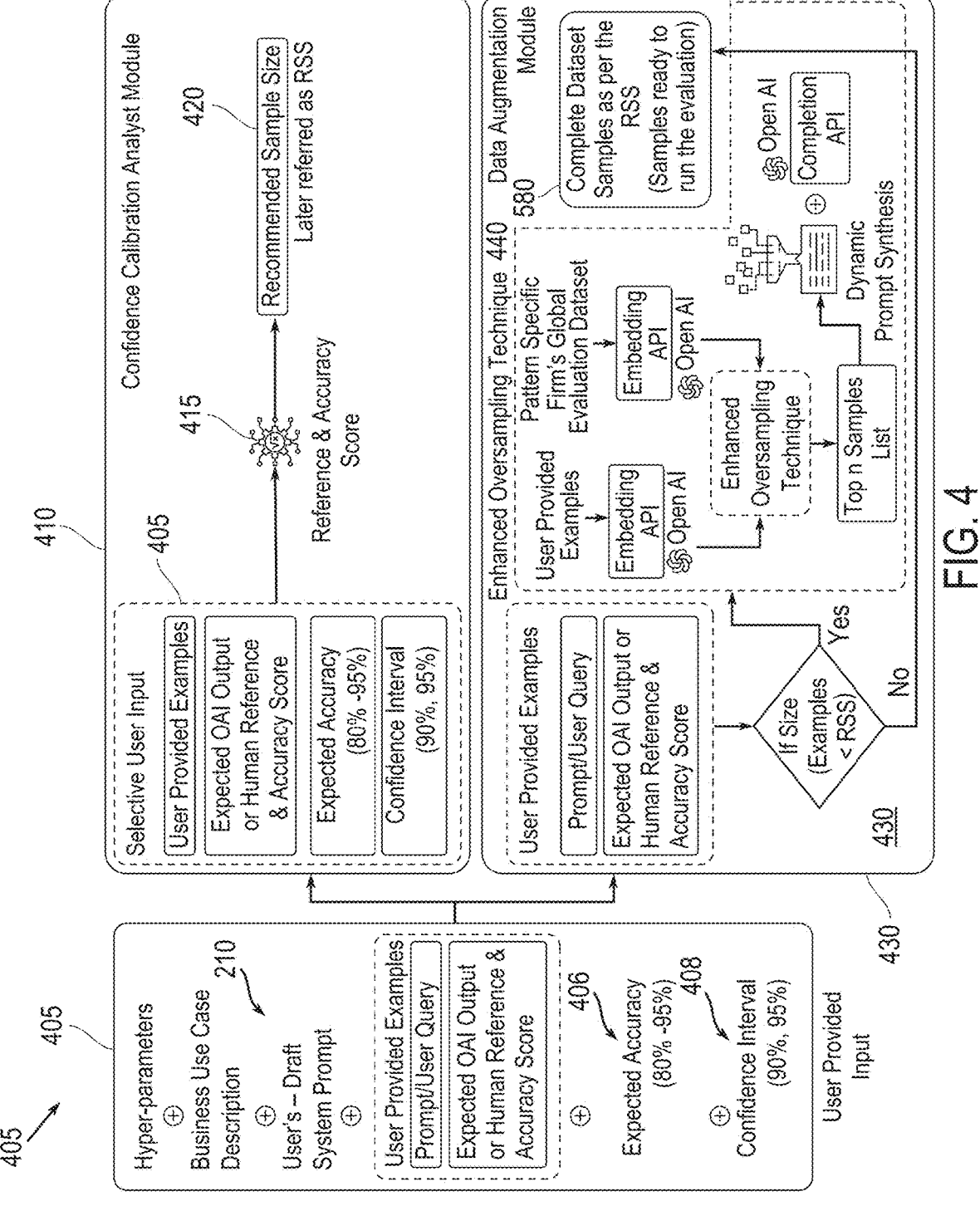
FIG. 4 is a flow diagram of an embodiment of an evaluation dataset preparation process according to the present disclosure.

FIG. 4 is a flow diagram of an embodiment of an evaluation dataset preparation process 120 according to the present disclosure. In dataset preparation, the user provides certain parameter inputs 405 which govern the dataset including a confidence interval 406 (e.g., 90%, 95%), an expected accuracy range 408 (e.g., 80%-95%). These inputs 406, 408 are provided in addition to the original inputs 210 provided in the metric mapping process. Inputs 405 are fed to a confidence calibration analysis [better not to personalize it by calling it an analyst for a patent application] module 410. The confidence calibration analysis module 410 is configured to determine a minimum sample size required for a statistical study that ensure the specified level of accuracy and confidence. This function is particularly beneficial in precision-critical scenarios such as evaluating machine learning models or conducting other statistical analyses.

In certain implementations the confidence calibration analysis module performs the following procedures in a confidence calibration sequence 415. It should be appreciated that in other embodiments, certain of the procedures can be skipped or eliminated, and in other implementation, additional procedures can be added for the same ultimate purposes of determining a minimum sample size. In the given implementation, first, the input confidence interval is converted from a percentage to a decimal form. This is crucial as further calculations in statistical analysis require the confidence level to be in a probability format (e.g., 95% becomes 0.95). In a following procedure, the statistical Z-score is calculated, which quantifies how many standard deviations an element is from the mean. This is achieved using the percentile point function (inverse of the cumulative distribution function) for the normal distribution. The Z-score is essential for determining the range within which the true mean lies with the specified confidence level. A margin of error is computed next, which represents the range within which the true value is expected to lie with respect to the sample estimate. The margin of error is pivotal in understanding the extent of variability or uncertainty in the sample estimates. Thereafter, the mean of the accuracy score that are provided by the user in user provide examples in the dataset is calculated. Last, a sample size is estimated using the previously calculated values (Z-score, mean, and margin of error). The sample size estimation can employ one or more statistical formulae to estimate the required sample size. Such formula integrates these values to determine how large a sample is needed to estimate the true mean with the desired accuracy and confidence level. The estimated sample size 420 is the output of the confidence calibration sequence 415.

In summary, the confidence calibration analysis module 410 encapsulates a series of statistical computations to provide a robust estimate of the necessary sample size for achieving reliable and accurate results in studies. This is invaluable in fields where precision and reliability in performance evaluation are paramount.

Figure 5:
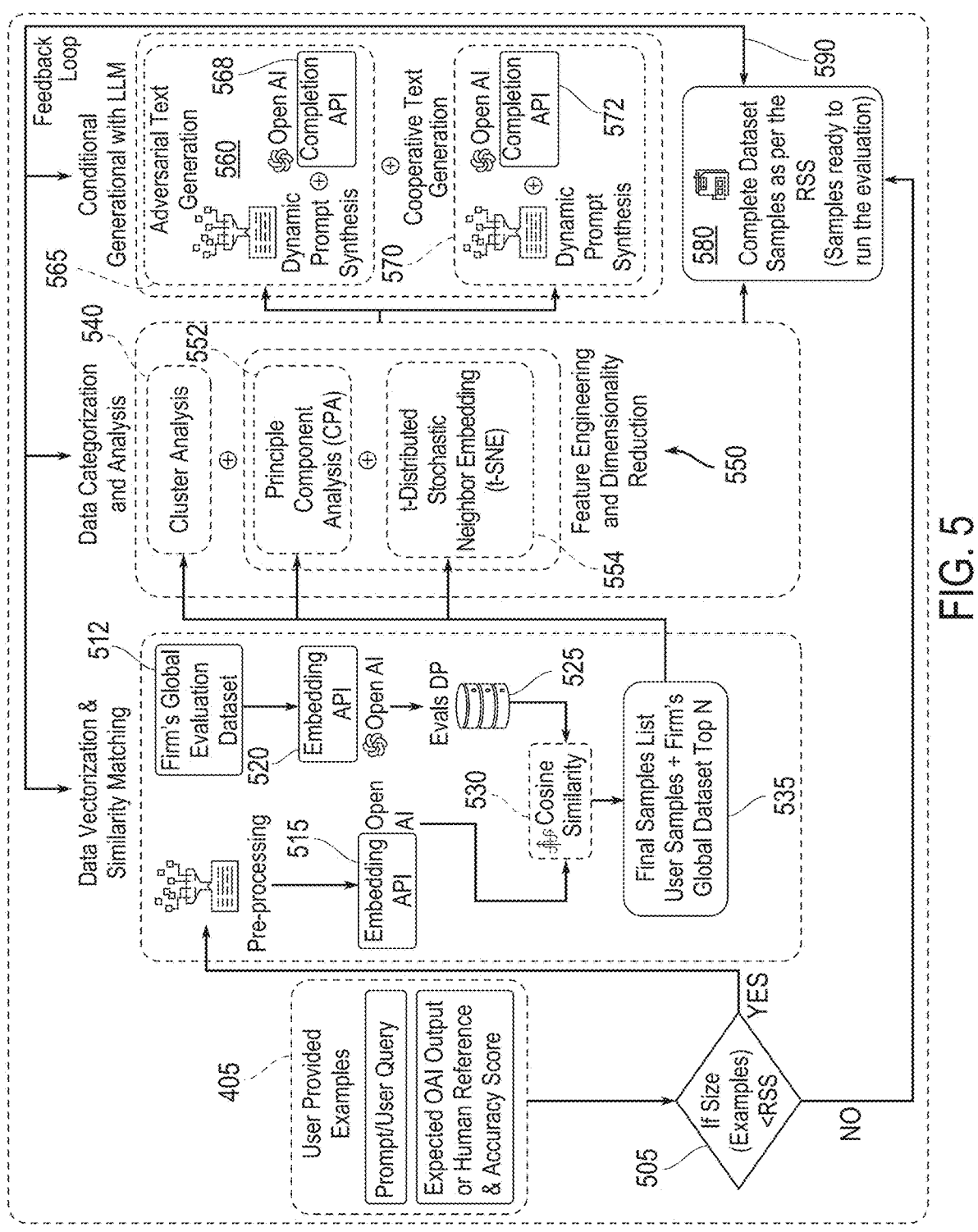
FIG. 5 is a flow diagram of an embodiment of a data augmentation process performed by the data augmentation module according to the present disclosure.

In a following part of the evaluation dataset preparation process 120 the inputs 405 including the selected expected accuracy 406 and confidence interval 408 are provided to a data augmentation module 430 which performs an enhanced oversampling technique 440. Detailed operation of an embodiment of the data augmentation procedures performed by data augmentation module 430 are shown in FIG. 5. The data augmentation process is a comprehensive approach to enhancing a dataset for Generative AI applications, focusing on improving model accuracy, fairness, and generalizability. In an initial step 505, the data augmentation module 430 determines whether the number of sample (i.e., sample size) of the user-provided examples in the user input 210 is less than the minimum recommended size (RSS) determined by the confidence calibration analysis module 410. In a following step, the user-provided data is first preprocessed 510 by vectorization into a suitable vector format and then passed to an LLM 515 (e.g., OpenAI embeddings) for semantic embedding. Similarly, a global dataset 512 (e.g., of a firm) is fed to an LLM 520. This is a one-time process for the global dataset. For user provided examples it's a run-time process. In both LLM processes 515, 520, textual data is transformed into high-dimensional vectors that capture semantic meanings. The output of the LLM processing on the global dataset is stored in a vector database 525. In a subsequent step of cosine similarity matching 530, cosine similarity is employed which outputs a selected number (N) of most similar samples 535 from the global dataset that are closest to each user-provided data point. This step ensures that the global dataset samples are relevant to the specific queries or data points provided by the user.

A following stage of the augmentation process involves data categorization and analysis. The top (N) sample output 535 of the cosine similarity matching is input to a cluster analysis algorithm 540 which performs a cluster analysis on the combined dataset of user-provided data and the top N similar samples. The cluster analysis 540 can aid in identifying distinct groups or "buckets" within the data, based on features like semantic content, user intent, etc. In a feature engineering and dimensionality reduction process 550 principal component analysis (PCA) 552 is performed to reduces the dimensionality of the top (N) sample data by transforming the original variables into a new set of variables (principal components), which are linear combinations of the original variables. The PCA 552 aids in interpretation of feature importance. Additionally, t-Distributed Stochastic Neighbor Embedding (t-SNE) 554 is performed for visualizing high-dimensional data by reducing dimensions in a way that preserves the similarity structure. T-SNE can be particularly helpful in understanding the data distribution and identifying clusters or outliers.

A final stage of the data augmentation process involved conditional generation 560 using an LLM (e.g., GPT-Turbo). The LLM is used to generate test data conditionally by prompting the LLM with specific instructions to generate test data that meets certain criteria. For example, if the existing data is biased towards 'gender', the LLM is prompted to generate examples focusing on 'age'. This method enables the creation of diverse and contextually relevant text samples that can fill gaps in the dataset, particularly in underrepresented categories. Two types of techniques are used. Adversarial text generation 565 uses the output of the cluster analysis 540 and feature engineering and dimensionality reduction 550 processes to generates prompts to the LLM. The LLM 568 in turn generates challenging or 'negative' samples by using adversarial techniques. For instance, modifying existing data points to create harder or misleading cases that the model needs to handle, thus improving its robustness. One example is altering a sentence structure or using synonyms to create semantically similar but syntactically different queries. In an alternative technique of cooperative text generation in which the output of the cluster analysis 540 and feature engineering and dimensionality reduction 550 processes are also used to generates prompts to the LLM; however, in this technique the LLM 572 is trained generate text collaboratively to produce coherent and contextually appropriate content. This helps ensuring a more diverse and comprehensive output. The output of the conditional generation process 560 is a complete augmented dataset 580 which reaches the minimal recommended sample size (RSS).

A feedback loop 590 is provided incorporate a feedback mechanism whereby the performance of the LLMs in the conditional generation processes on new, real-world data can be used to further refine and enhance the dataset. The feedback loop 590 helps ensure that dataset not only becomes more robust and balanced but also caters to the nuances and specific needs of GenAI use cases. This approach not only improves model accuracy but also enhances its fairness and generalizability.

Figure 6:
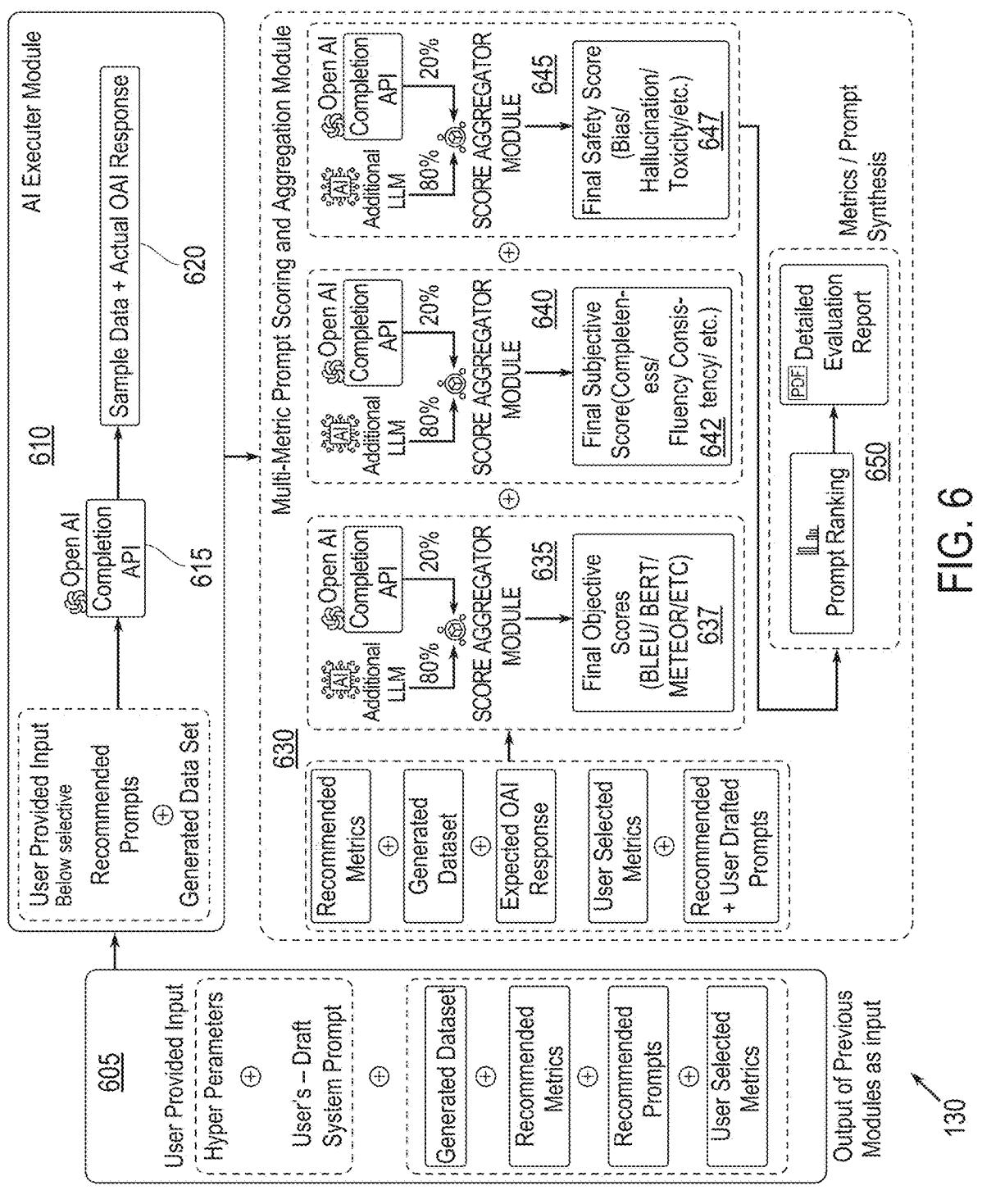
FIG. 6 is a flow diagram of an embodiment of an LLM evaluation process performed by the according to the present disclosure.

Reference is now made to FIG. 6 which is a flow diagram of an LLM evaluation process 130 according to an embodiment of the present disclosure. The outputs of the previous evaluation planning 110 data augmentation 120 processes are provided as inputs 605 to an AI executor module 610. The inputs 605 include LLM hyperparameters, user's business use case description and draft system prompt, as well as recommended objective, subjective and safety metrics and recommended prompts from the evaluation planning phase. The augmented dataset from the data augmentation process is also part of input 605. The AI Executor module 610 includes an LLM 615 (e.g., OpenAI completion AI) that executes the recommended prompts with the different datasets generated and provided by the user using consistent hyperparameters provided and extracts responses. The prompt results 620 are then passed to a multi-metric prompt scoring and aggregation module 630. This ensures uniformity in evaluation by running each prompt with the same hyperparameters & evaluation dataset, extracting LLM (e.g., OpenAI) responses for further analysis, and preparing the results for scoring across different metrics. All prompts are then evaluated under identical conditions, allowing for fair and reliable comparisons.

The Multi-Metric Prompt Scoring and Aggregation Module 630 is configured to execute comprehensive evaluations of AI-generated & user-provided system prompts using recommended and user selected metrics. It integrates advanced scoring algorithms and structured prompting techniques to ensure accurate, reliable, and standardized assessments and provide a detailed summary of each prompt based on these aspects. The module 630 comprises three metric extraction components categorized into objective 635 (e.g., BLEU, METEOR, TER, BERT etc.) subjective 640 (e.g., completeness, truthfulness etc.), and safety-related 645 (e.g., hallucination, toxicity, bias etc.) dimensions. Each metric extraction component 635, 640, 645 includes an additional LLM which extracts metrics related to the use case. Python libraries and other resources can also be used in this operation. Each extraction component 635, 640, 645 further includes OpenAI prompting process which performs a structured prompting technique. The OpenAI prompting technique provides explicit instructions for evaluating the content and down the evaluation process into clear, manageable steps that focus precisely on specified metrics. Each metric is defined with a detailed criterion, rating each aspect on a scale from 1 to 5, thereby standardizing evaluations and reducing subjective variance.

The results from LLM metric extraction components and OpenAI structured prompting techniques are input to a score aggregator module in each of the respective objective, subjective, and safety-related components 635, 640, 645. The score aggregation modules of each component mathematically aggregate, by weighted average, the scores based on predefined preferences for each evaluation category. In some implementations, the weighting is distributed as follows: for objective metrics, 80% from the additional LLM(s) and 20% from OpenAI completions; for subjective metrics, 40% from additional LLM(s) and 60% from OpenAI completions; and for safety metrics, 40% from additional LLM(s) and 60% from OpenAI completions. The score aggregation modules yield, respectively, a final objective score 638, a final subjective score 642 and a final safety score 647. The final objective score, 638, final subjective score 642 and final safety score 647 are output to a metric/prompt synthesis process which is shown in greater detail in FIG. 7.

Figure 7:
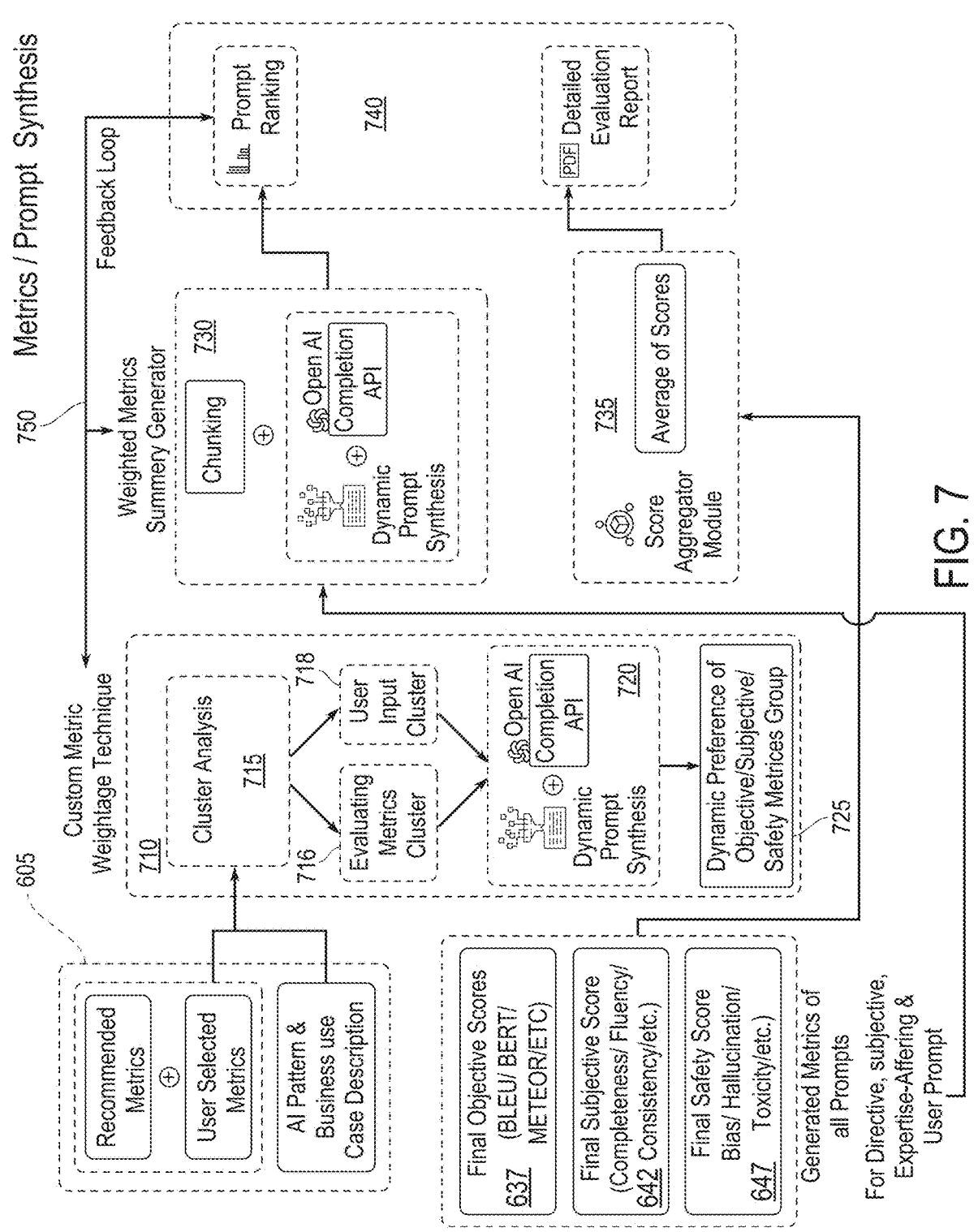
FIG. 7 is a flow diagram of an embodiment of a metrics/prompt synthesis process according to the present disclosure.

In the Metrics/Prompt Synthesis process shown in FIG. 7, the user inputs 605 and the finalized scores 637, 642, 647 are input to a cluster weighting module 710. The cluster weighting module 710 which is configured to prioritize metrics based on the specific use case by conducting cluster analysis 715 to group similar metrics and by using AI patterns/ business use case descriptions. This results in two clusters: the Evaluated Metrics Cluster 716, which includes relevant and effective metrics, and the User Input Cluster 718, which reflects user-defined metric preferences. A dynamic Prompt Synthesis process 720 leverages an LLM (e.g., OpenAI Completion A PI) with a zero-shot prompting technique. This process dynamically aligns with the preferences of the Objective/Subjective/Safety metrics groups to ensure balanced evaluations across categories. The output 725 of the cluster weighting module 710 is a dynamic preference measure of the Objective, Subjective, and Safety metrics groups. This output is fed to a weighted metrics summary generator 730 which is configured to analyze the scores and corresponding weightings of each metric, creating a summary view. The weighted metrics summary generator 730 aggregates evaluation metric data from all prompts and utilizes an LLM (e.g., OpenAI completions) with zero-shot prompting to extract a detailed summary for each prompt.

A final score aggregation and feedback component compiles scores from the objective, subjective, and safety categories 735 into a unified evaluation report 740. This can be performed, for example, using a charts.js library in Angular. This detailed report provides comprehensive insights at each metric level, facilitating a thorough understanding of the AI-generated content's quality and compliance with specified criteria. Feedback 750 on the report can be used to update the clustering algorithm 710.

The methods and processes described herein are performed by multiple computing devices (e.g., user devices, physical servers, workstations, storage arrays, cloud computing resources, etc.) that communicate and interoperate over one or more networks to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices can be, but need not be, co-located. The results of the disclosed methods and tasks can be persistently stored by transforming physical storage devices, such as solid-state memory chips or magnetic disks, into a different state. In some embodiments, the computer system may be a cloud-based computing system whose processing resources are shared by multiple distinct business entities or other users.

The methods described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium.

The modules described herein which are executed on one or more computing devices and information processors which can communicate with other information processors within the organization and outside of the organization (e.g., to proxy vendor services) using data connections over a data network. Data connections can be any known arrangement for wired (e.g., high-speed fiber) or wireless data communication, using any suitable communication protocol, as known in the art.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

A Iso, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the disclosure has been described with reference to exemplary embodiments, it will be understood by those skilled in the art that various changes may be made and equivalents may be substituted for elements thereof without departing from the scope of the disclosed invention. In addition, many modifications will be appreciated by those skilled in the art to adapt a particular instrument, situation or material to the teachings of the disclosure without departing from the essential scope thereof. Therefore, it is intended that the invention not be limited to the particular embodiment disclosed as the best mode contemplated for carrying out this invention, but that the invention includes all embodiments falling within the scope of the appended claims.

What is claimed is:

1. A computer-implemented method of assessing a large language model (LLM) comprising:
    receiving user inputs concerning the LLM including selected hyperparameters, a use case, at least one prompt, and user provided examples;
    mapping the user inputs with a glossary of LLM metrics to determine at least one recommended metric and at least one recommended prompt for the LLM;
    determining a minimum recommended sample size based on the user inputs, recommended at least one metric and expected confidence and accuracy;
    augmenting an LLM-generated dataset related to the use case when it is determined that the user inputs and LLM-generated dataset has fewer entries than the minimum recommended sample size; and
    generating an evaluation report for assessing the recommended at least one metric for determining the accuracy of: i) the LLM based on the user inputs, recommended at least one metric and the LLM-generated dataset, ii) the at least one user prompt, and iii) at least one recommended prompt.

2. The computer-implemented method of claim 1, further comprising:
    receiving the augmented LLM-generated dataset, recommended at least one metric, recommended prompts and user selected metrics;
    generating a final objective metric ranking, final subjective metric ranking, and final safety metric ranking using an LLM based on the received augmented LLM-generated dataset, recommended at least one metric, recommended prompts and user selected metrics; and
    generating an aggregated prompt ranking that includes the final objective metric ranking, final subjective metric ranking, and final safety metric ranking.

3. The computer-implemented method of claim 2, wherein the final objective metric ranking, final subjective metric ranking, and final safety metric ranking are each determined by extracting metrics related to the use case using an additional, second LLM and executing a structured prompt using the first LLM which includes instructions for evaluating content according to a respective criterion.

4. The computer-implemented method of claim 2, further comprising:
    receiving the final objective metric ranking, final subjective metric ranking, and final safety metric ranking; and
    generating a prompt by dynamically aligning with the preferences of the final objective metric ranking, final subjective metric ranking, and final safety metric rating using an LLM to balance evaluations across categories.

5. The computer-implemented method of claim 1, wherein the at least one recommended metric and at least one recommended prompt for the LLM determined by the mapping includes a selected number of objective metrics, a selected number of subjective metrics and a selected number of safety metrics.

6. The computer-implemented method of claim 1, wherein the mapping includes the steps of:
    comparing an embedded model of the user inputs concerning the LLM and an embedded topic model of the glossary of LLM metrics using cosine textual similarity to obtain a cosine similarity ranking list; and
    determining a topic similarity between the embedded model of the user input concerning the LLM and the embedded topic model of the glossary of LLM metrics to obtain a topic similarity ranking list; and
    inputting to user inputs, the cosine similarity ranking list and topic similarity ranking list to an LLM to determine an LLM-based similarity ranking list.

7. The computer-implemented method of claim 6, further comprising aggregating the cosine similarity ranking list, the topic similarity ranking list and the LLM-based similarity ranking list with selected weights for each respective list to determine ranked lists of recommended objective metrics, subjective metrics and safety metrics.

8. The computer-implemented method of claim 6, further comprising synthesizing dynamic prompts based on the at least one prompt provided in the user input, the dynamic prompts including a plurality of variations that align with different approaches.

9. The computer-implemented method of claim 6, wherein the dynamic prompts include a directive prompt that provides explicit instructions to the LLM; a Scenario-Based prompt that situates the LLM within a hypothetical but plausible scenario, and an Expertise-Affirming prompt that underscores a role of the LLM as an expert with a specific domain.

10. The computer-implemented method of claim 6, wherein the steps of augmenting an LLM-generated dataset includes:
    comparing a vectorized version of the user provided examples with vectorized examples from a global dataset;
    selecting a group of closest samples from the user provided examples and vectorized examples based on the comparison; and performing cluster analysis, feature engineering and dimensionality reduction on the group of closest samples, yielding a modified example set; and generating additional samples based on the modified example set using an LLM that employs and adversarial text generation process; and generating additional samples based on the modified example set using an LLM that employs and cooperative text generation process.

* * * * *